United States Patent
Nishina et al.

(10) Patent No.: US 8,365,228 B2
(45) Date of Patent: Jan. 29, 2013

(54) INFORMATION TRANSMITTING APPARATUS AND METHOD, INFORMATION RECEIVING APPARATUS AND METHOD, PROVIDER, AND BROADCASTING SYSTEM

(75) Inventors: Yasutomo Nishina, Chiba (JP); Tomoyuki Hanai, Kanagawa (JP); Masahiko Sato, Tokyo (JP)

(73) Assignee: Sony Corporation, Tokyo (JP)

(*) Notice: Subject to any disclaimer, the term of this patent is extended or adjusted under 35 U.S.C. 154(b) by 321 days.

(21) Appl. No.: 12/358,643

(22) Filed: Jan. 23, 2009

(65) Prior Publication Data
US 2009/0133075 A1     May 21, 2009

Related U.S. Application Data

(60) Division of application No. 12/099,442, filed on Apr. 8, 2003, now abandoned, which is a continuation of application No. 09/334,424, filed on Jun. 16, 1999, now abandoned.

(30) Foreign Application Priority Data

Jun. 18, 1998 (JP) .................................. 10-171096
Jun. 18, 1998 (JP) .................................. 10-171097

(51) Int. Cl.
    *H04N 5/445*     (2011.01)
    *G06F 3/00*     (2006.01)
    *G06F 13/00*     (2006.01)

(52) U.S. Cl. ............ 725/54; 725/71; 725/116; 725/118; 725/126; 725/146; 725/148; 370/486; 370/487; 370/468; 370/535; 370/537; 370/538

(58) Field of Classification Search ............. 725/54, 725/71, 116, 118, 126, 146, 148; 370/486–487, 370/468, 535, 537–538
See application file for complete search history.

(56) References Cited

U.S. PATENT DOCUMENTS

| | | | | |
|---|---|---|---|---|
| 5,485,221 A | * | 1/1996 | Banker et al. | 348/563 |
| 5,579,055 A | * | 11/1996 | Hamilton et al. | 725/49 |
| 5,682,387 A | | 10/1997 | Satoh | |
| 5,708,664 A | | 1/1998 | Budge et al. | |
| 5,737,030 A | | 4/1998 | Hong et al. | |
| 5,801,753 A | | 9/1998 | Eyer et al. | |
| 5,841,433 A | * | 11/1998 | Chaney | 725/50 |
| 5,886,995 A | * | 3/1999 | Arsenault et al. | 370/477 |
| 5,892,894 A | | 4/1999 | Shiroshita et al. | |
| 5,905,713 A | * | 5/1999 | Anderson et al. | 370/241 |

(Continued)

FOREIGN PATENT DOCUMENTS

| | | |
|---|---|---|
| EP | 0 479 432 | 4/1992 |
| EP | 0 679 030 | 10/1995 |

(Continued)

OTHER PUBLICATIONS

Kai K et al: "Services and navigation in satellite ISDM" Consumer Electronics, 1997. ISCE '97L, Proceedings of 1997 IEEE International Symposium on Singapore Dec. 2-4, 1997, New York, NY, USA, IEEE, US, Dec. 2, 1997, pp. 1-4, XP010268669.

(Continued)

*Primary Examiner* — Jason Salce
(74) *Attorney, Agent, or Firm* — Frommer Lawrence & Haug LLP; William S. Frommer

(57) ABSTRACT

MPEG video encoders and MPEG audio encoders encode video signals and audio signals, respectively. An SI/EPG data generator generates program information. A transport stream multiplexer multiplexes the program information with video data and audio data. A system controller controls the data output rates of the encoding operations and the multiplexing ratio.

9 Claims, 12 Drawing Sheets

| KIND OF PROGRAM INFORMATION | | TABLE_ID | RE-TRANSMISSION CYCLE (Sec) | TRANSMISSION RATE (kbps) |
|---|---|---|---|---|
| PROGRAM INFORMATION OF SELF STATION | CURRENT, NEXT | 0X4E | 3 | 1 |
| | WITHIN 6 HOURS FROM PRESENT TIME | 0X50 | 5 | 5 |
| | 6-24 HOURS AWAY | 0X51 | 10 | 10 |
| | 2-3 DAYS AWAY | 0X52 | 20 | 10 |
| | 4-8 DAYS AWAY | 0X53 | 30 | 30 |
| PROGRAM INFORMATION OF ANOTHER STATION | CURRENT, NEXT | 0X4F | 3 | 10 |
| | WITHIN 6 HOURS FROM PRESENT TIME | 0X60 | 5 | 30 |
| | 6-24 HOURS AWAY | 0X61 | 10 | 64 |
| | 2-3 DAYS AWAY | 0X62 | 20 | 60 |
| | 4-8 DAYS AWAY | 0X63 | 30 | 120 |
| TOTAL | | | | 330 |

U.S. PATENT DOCUMENTS

| | | | |
|---|---|---|---|
| 5,930,808 | A | 7/1999 | Yamanaka et al. |
| 5,999,216 | A | 12/1999 | Kaars |
| 6,035,304 | A | 3/2000 | Machida et al. |
| 6,047,317 | A | 4/2000 | Bisdikian et al. |
| 6,052,556 | A * | 4/2000 | Sampsell .................. 725/133 |
| 6,057,890 | A | 5/2000 | Virden et al. |
| 6,111,612 | A | 8/2000 | Ozkan et al. |
| 6,160,545 | A | 12/2000 | Eyer et al. |
| 6,173,330 | B1 | 1/2001 | Guo et al. |
| 6,185,360 | B1 | 2/2001 | Inoue et al. |
| 6,212,680 | B1 | 4/2001 | Tsinberg et al. |
| 6,215,530 | B1 | 4/2001 | Wasilewski |
| 6,233,253 | B1 | 5/2001 | Settle et al. |
| 6,240,103 | B1 | 5/2001 | Schoenblum et al. |
| 6,252,907 | B1 | 6/2001 | Hwang |
| 6,285,689 | B1 | 9/2001 | Negishi et al. |
| 6,310,898 | B1 | 10/2001 | Schwartz |
| 6,327,275 | B1 | 12/2001 | Gerdner et al. |
| 6,351,474 | B1 | 2/2002 | Robinett et al. |
| 6,405,371 | B1 | 6/2002 | Oosterhout et al. |
| 6,487,720 | B1 | 11/2002 | Ohnishi |
| 6,505,347 | B1 * | 1/2003 | Kaneko et al. ................. 725/39 |
| 6,507,950 | B1 * | 1/2003 | Tsukidate et al. ............. 725/54 |
| 6,522,672 | B1 | 2/2003 | Matsuzaki et al. |
| 6,542,518 | B1 | 4/2003 | Miyazawa |
| 7,032,236 | B1 * | 4/2006 | Ozkan et al. .................. 725/39 |

FOREIGN PATENT DOCUMENTS

| | | |
|---|---|---|
| EP | 0 697 789 | 2/1996 |
| EP | 0 719 062 | 6/1996 |
| EP | 0 802 677 | 10/1997 |
| EP | 0 822 714 | 2/1998 |
| EP | 0 822 716 | 2/1998 |
| JP | 10 117329 | 5/1998 |
| JP | 11 41752 | 2/1999 |
| JP | 11 340935 | 12/1999 |
| WO | WO 97/46015 | 12/1997 |
| WO | WO 98 11687 | 3/1998 |

OTHER PUBLICATIONS

Heredia E A et al: "Using multiresolution and multistreaming for faster access in image database broadcast" Image Processing, 1998. ICIP 98. Proceedings. 1998 International Conference on Chicago, IL, USA Oct. 4-7, 1998, Los Alamitos, CA, USA, IEEE Comput. Soc, US, Oct. 4, 1998, pp. 784-788, XP010308554.

* cited by examiner

FIG. 1

| KIND OF PROGRAM INFORMATION (EIT) | | Table_id | RE-TRANSMISSION CYCLE (sec) | TRANSMISSION RATE (kbps) |
|---|---|---|---|---|
| PROGRAM INFORMATION OF SELF STATION | CURRENT, NEXT | 0x4E | 3 | 1 |
| | WITHIN 6 HOURS FROM PRESENT TIME | 0x50 | 5 | 5 |
| | 6-24 HOURS AWAY | 0x51 | 10 | 10 |
| | 2-3 DAYS AWAY | 0x52 | 20 | 10 |
| | 4-8 DAYS AWAY | 0x53 | 60 | 10 |
| PROGRAM INFORMATION OF ANOTHER STATION | CURRENT, NEXT | 0x4F | 3 | 10 |
| | WITHIN 6 HOURS FROM PRESENT TIME | 0x60 | 5 | 32 |
| | 6-24 HOURS AWAY | 0x61 | 20 | 32 |
| | 2-3 DAYS AWAY | 0x62 | 60 | 20 |
| | 4-8 DAYS AWAY | 0x63 | 180 | 20 |
| TOTAL | | | | 150 |

FIG. 4

| KIND OF PROGRAM INFORMATION | | TABLE_ID | RE-TRANSMISSION CYCLE (Sec) | TRANSMISSION RATE (kbps) |
|---|---|---|---|---|
| PROGRAM INFORMATION OF SELF STATION | CURRENT, NEXT | 0X4E | 3 | 1 |
| | WITHIN 6 HOURS FROM PRESENT TIME | 0X50 | 5 | 5 |
| | 6-24 HOURS AWAY | 0X51 | 10 | 10 |
| | 2-3 DAYS AWAY | 0X52 | 20 | 10 |
| | 4-8 DAYS AWAY | 0X53 | 30 | 30 |
| PROGRAM INFORMATION OF ANOTHER STATION | CURRENT, NEXT | 0X4F | 3 | 10 |
| | WITHIN 6 HOURS FROM PRESENT TIME | 0X60 | 5 | 30 |
| | 6-24 HOURS AWAY | 0X61 | 10 | 64 |
| | 2-3 DAYS AWAY | 0X62 | 20 | 60 |
| | 4-8 DAYS AWAY | 0X63 | 30 | 120 |
| TOTAL | | | | 330 |

FIG. 9

| SYNTAX | NUMBER OF BITS | MNEMONIC |
|---|---|---|
| event_information () { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i<N; i++) { | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for (i=0; i<N; i++) { | | |
|         } | | |
|     } | | |
| CRC_32 | 32 | rpchof |
| } | | |

FIG. 10

```
data_length
for ( i=0 ; i < data_length ; i ++ ) {
  table_id         8 bit  table_id of eit to be described
                          (formal drawing: table_id of eit to be described)
  status_flag      1 bit  status of eit indicated by above table_id
  version_number   5 bit  version of eit indicated by above table_id
}
```

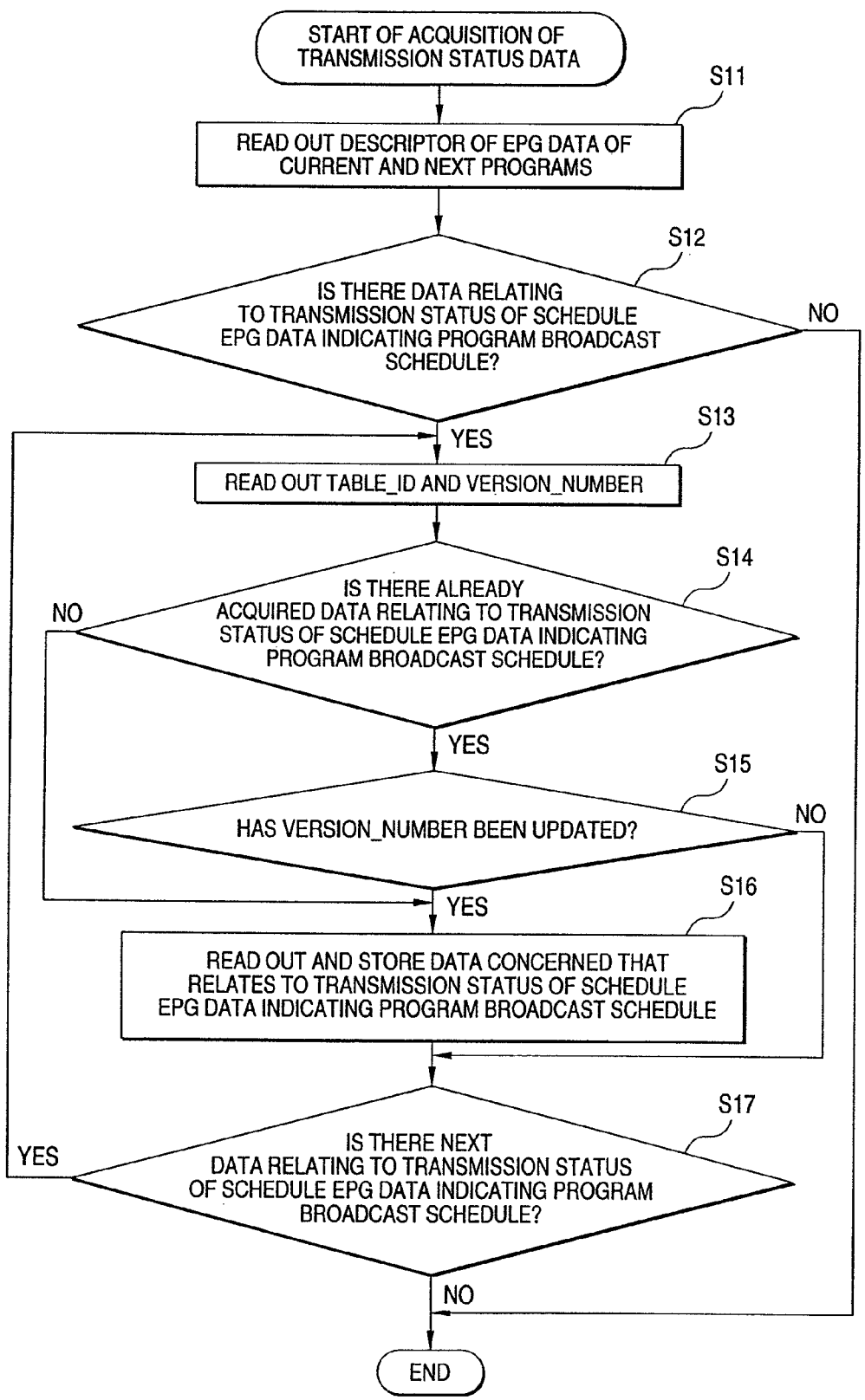

FIG. 12

| SYNTAX | NUMBER OF BITS | MNEMONIC |
|---|---|---|
| table_information_section () { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for (i=0; i<N; i++) { | | |
|         table_id | 8 | uimsbf |
|         repeating_rate | 16 | bslbf |
|         update_time | 40 | bslbf |
|         status_flag | 1 | bslbf |
|         reserved_future_use | 3 | bslbf |
|         descriptors_loop_length | 12 | uimsbf |
|         for (i=0; i<N; i++) { | | |
|             descriptor () | | |
|         } | | |
|     } | | |
|     CRC_32 | 32 | rpchof |
| } | | |

US 8,365,228 B2

INFORMATION TRANSMITTING APPARATUS AND METHOD, INFORMATION RECEIVING APPARATUS AND METHOD, PROVIDER, AND BROADCASTING SYSTEM

This is a division of application Ser. No. 12/099,442, filed Apr. 8, 2008 now abandoned, which is a continuation of application Ser. No. 09/334,424, filed Jun. 16, 1999, now abandoned which is entitled to the priority filing date of Japanese applications 10-171096 and 10-171097 filed on Jun. 18, 1998, the entirety of which are hereby incorporated by reference herein.

BACKGROUND OF THE INVENTION

1. Field of the Invention

The present invention relates to an information transmitting apparatus and method, an information receiving apparatus and method, a provider, and a broadcasting system. In particular, the invention relates to an information transmitting apparatus and method, an information receiving apparatus and method, a provider, and a broadcasting system in which the transmission amount of data of program information can be increased when the transmission amounts of video data and audio data can be decreased. The invention also relates to an information transmitting apparatus and method, an information receiving apparatus and method, a provider, and a broadcasting system in which the information receiving apparatus can recognize, in a short time, the transmission statuses of schedule EPG data that indicate program broadcast schedules of the transmission side.

2. Description of the Related Art

In digital broadcasting systems, EPG (electronic program guide) data for providing program information is formed in an EIT (event information table) format according to the rules of DVB/SI (Digital Video Broadcasting/service Information: EN300468) and multiplexed with other services information (SI) into a transport stream.

FIG. 1 is a table showing an example of the EIT in which the total transmission rate of EPG information is set at 150 kbps. The EIT consists of a network ID, a TS-ID, a service ID, table IDs, program broadcast hours corresponding to the table IDs, program lengths corresponding to the table IDs, and other data. Further, a program title, genre information, etc. can be described in descriptors together with a broadcast start hour and a program length.

The EIT generally consists of EPG data of the self station and EPG data of other stations, each of which consists of data of current and next programs, data of programs within 6 hours from the present time, data of programs that are 6-24 hours away, data of programs that are 2-3 days away, and data of programs that are 4-8 days away. The data of programs within 6 hours from the present time, the data of programs that are 6-24 hours away, the data of programs that are 2-3 days away, and the data of programs that are 4-8 days away are generically called schedule EPG data that indicates a program broadcast schedule. Each of those EPG data has its own Table_id (Table_identification code) and a re-transmission cycle. EPG data are transmitted at re-transmission cycles that are set for the respective Table_id data and have respective prescribed transmission rates. The EPG data of current and next programs has a relatively short re-transmission cycle of about several seconds. On the other hand, the schedule EPG data indicating a program broadcast schedule has a re-transmission cycle of about several minutes, which is longer than the re-transmission cycle of the EPG data of current and next programs.

As shown in FIG. 2, as for the transmission of EPG data, a prescribed EPG data (including prescribed services information) occupation bandwidth is set for the transmission channel bandwidth of a digital broadcasting system. Since priority is given to the transmission of video data and audio data, the EPG data occupation bandwidth does not vary even if a free portion occurs in the occupation bandwidth for the transmission of video data or the occupation bandwidth for the transmission of audio data.

A viewer takes long time to acquire program information when the data amount of EPG data is large, because EPG data is transmitted to an information receiving apparatus at a constant transmission rate even if a free portion occurs in the occupation bandwidths for the transmission of video data and audio data.

Further, since schedule EPG data indicating program broadcast schedules has long re-transmission cycles and there is no data indicating their transmission statuses, an information receiving apparatus takes long time to judge the state of the transmission side when the transmission of the schedule EPG data is suspended due to the equipment trouble on the transmission side.

SUMMARY OF THE INVENTION

The present invention has been made in view of the above circumstances, and an object of the invention is therefore to enable acquisition of program information in a short time by increasing the transmission amount of data of program information when the transmission amounts of video data and audio data can be decreased.

Another object of the invention is to allow an information receiving apparatus to recognize, in a short time, the transmission statuses of schedule EPG data that indicate program broadcast schedules of the transmission side.

An information transmitting apparatus according to the invention comprises multiplexing means for multiplexing a plurality of signals; and control means for controlling a multiplexing ratio among the plurality of signals in the multiplexing means.

An information transmitting method according to the invention comprises a multiplexing step of multiplexing a plurality of signals; and a control step of controlling a multiplexing ratio among the plurality of signals in the multiplexing step.

A provider according to the invention provides a computer-readable program for causing an information transmitting apparatus to execute a process comprising: a multiplexing step of multiplexing a plurality of signals; and a control step of controlling a multiplexing ratio among the plurality of signals in the multiplexing step.

An information receiving apparatus according to the invention comprises separating means for separating program information that is multiplexed with a video signal and an audio signal; storing means for storing the program information separated by the separating means; and control means for controlling operations of the separating means and the storing means in accordance with a transmission rate of the program information.

An information receiving method according to the invention comprises a separating step of separating program information that is multiplexed with a video signal and an audio signal; a storing step of storing the program information separated by the separating means; and a control step of controlling operations of the separating step and the storing step in accordance with a transmission rate of the program information.

A provider according to another aspect of the invention provides a computer-readable program for causing an information receiving apparatus to execute a process comprising a separating step of separating program information that is multiplexed with a video signal and an audio signal; a storing step of storing the program information separated by the separating means; and a control step of controlling operations of the separating step and the storing step in accordance with a transmission rate of the program information.

A broadcasting system according to the invention is such that an information transmitting apparatus comprises video encoding means for encoding a video signal; audio encoding means for encoding an audio signal; program information data generating means for generating data of program information; multiplexing means for multiplexing the data of the program information that is output from the program information data generating means with video data that is output from the video encoding means and audio data that is output from the audio encoding means; and control means for controlling a data output rate of the video encoding means, a data output rate of the audio encoding means, a data output rate of the program information data generating means, and a multiplexing ratio among the video data, the audio data, and the data of the program information in the multiplexing means, and that an information receiving apparatus comprises separating means for separating the program information that is multiplexed with the video signal and the audio signal; storing means for storing the program information separated by the separating means; and control means for controlling operations of the separating means and the storing means in accordance with a transmission rate of the program information.

An information transmitting apparatus according to another aspect of the invention comprises program information data generating means for generating program information data including information of a transmission status of program information; and multiplexing means for multiplexing the program information data generated by the program information data generating means with an encoded video signal and an encoded audio signal.

BRIEF DESCRIPTION OF THE DRAWINGS

FIG. 1 is a table showing an example of EIT;

FIG. 4 is a table showing an EIT in which the total transmission rate of EPG information is set at 330 kbps;

FIG. 9 shows an EIT form that defines a description format of EPG data of current and next programs;

FIG. 10 shows a description of the transmission statuses of schedule EPG data that is made in a descriptor of EPG data of current and next programs and indicates program broadcast schedules;

FIG. 11 is a flowchart showing a process of the information transmitting apparatus for acquiring data of the transmission statuses of schedule EPG data indicating program broadcast schedules; and FIG. 12 shows a form of a table information table that defines an SI description format.

DETAILED DESCRIPTION OF THE PREFERRED EMBODIMENTS

Figure 2:
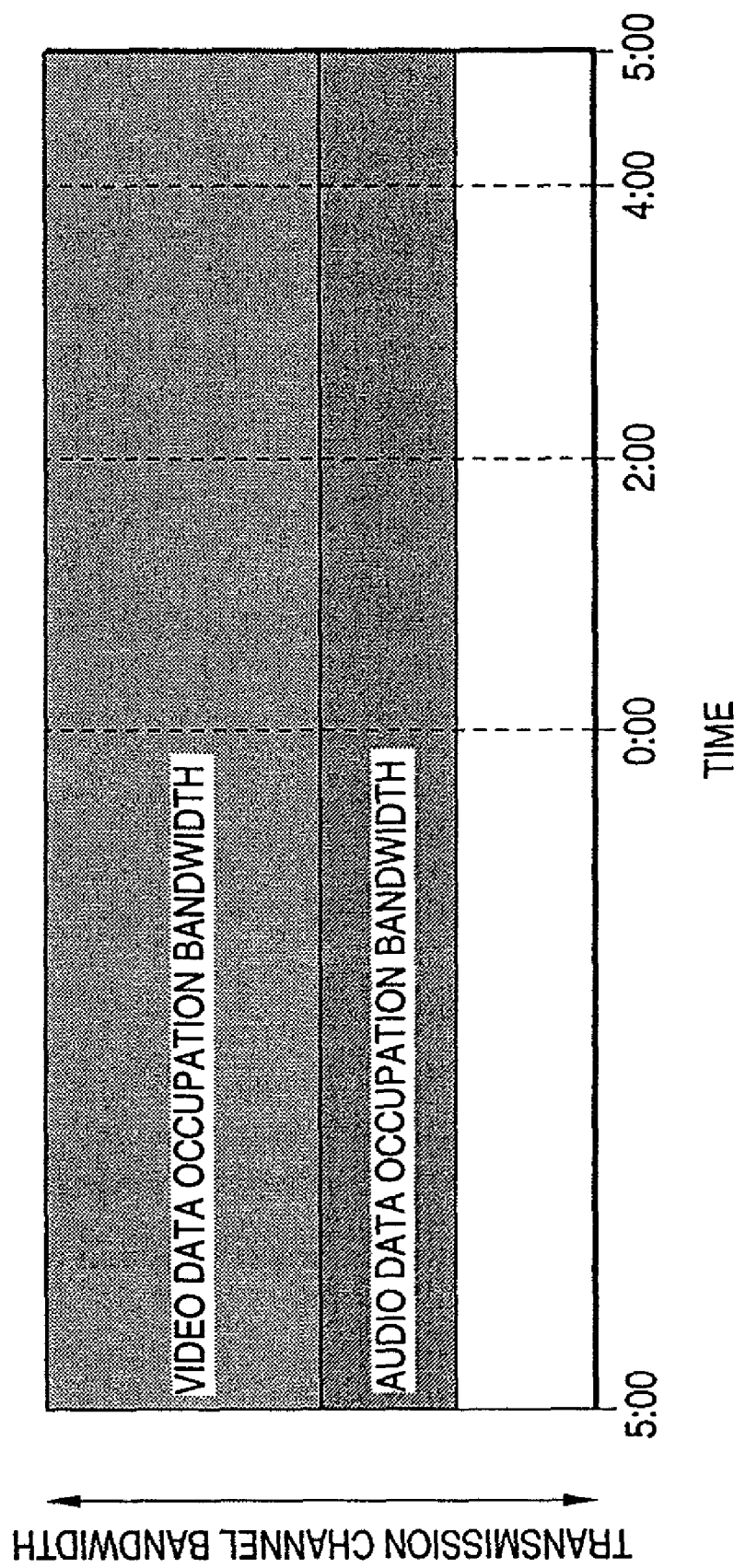
FIG. 2 shows how a video data occupation bandwidth, an audio data occupation bandwidth, and an EPG data occupation bandwidth vary with time in relation to a transmission channel bandwidth.
Figure 3:
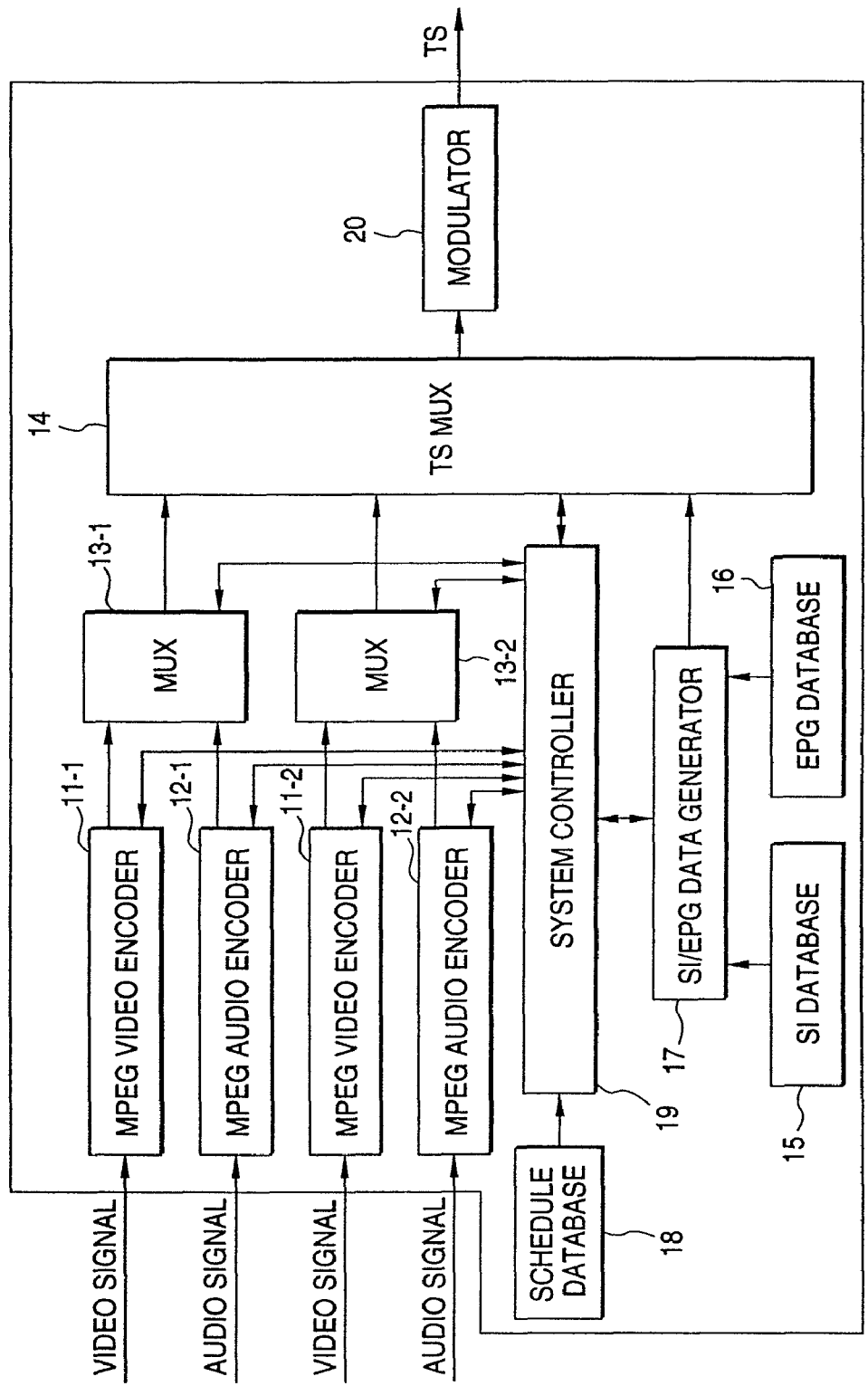
FIG. 3 is a block diagram showing the configuration of an information transmitting apparatus according to an embodiment of the present invention.

FIG. 3 is a block diagram showing the configuration of an information transmitting apparatus according to an embodiment of the invention. The information processing apparatus 1 outputs a transport stream TS based on a plurality of video signals and audio signals that are input externally. An MPEG video encoder 11-1 generates a video elementary stream based on a video signal that is input externally and outputs it to a multiplexer 13-1. An MPEG video encoder 11-2 generates a video elementary stream based on a video signal that is input externally and outputs it to a multiplexer 13-2.

An MPEG audio encoder 12-1 generates an audio elementary stream based on an audio signal that is input externally and outputs it to the multiplexer 13-1. An MPEG audio encoder 12-2 generates an audio elementary stream based on an audio signal that is input externally and outputs it to the multiplexer 13-2.

The multiplexer 13-1 multiplexes a video elementary stream supplied from the MPEG video encoder 11-1 and an audio elementary stream supplied from the MPEG audio encoder 12-1 by incorporating those into packets having a prescribed fixed length, and outputs the packets to a transport stream multiplexer 14. The multiplexer 13-2 multiplexes a video elementary stream supplied from the MPEG video encoder 11-2 and an audio elementary stream supplied from the MPEG audio encoder 12-2 by incorporating those into packets having a prescribed fixed length, and outputs the packets to the transport stream multiplexer 14.

An SI database 15 supplies system information data stored therein to an SI/EPG data generator 17. An EPG database 16 supplies EPG data stored therein to the SI/EPG data generator 17. The SI/EPG data generator 17 incorporates data that are supplied from the SI database 15 and the EPG database 16 and data indicating the transmission statuses of schedule EPG data that indicate program broadcast schedules into packets of a prescribed fixed length and outputs the packets to the transport stream multiplexer 14.

A schedule database 18 supplies a system controller 19 with the contents, transmission rates, re-transmission cycles, etc. of video data, audio data, and EPG data, respectively, that will be transmitted from the information transmitting apparatus at each time point. Based on the data supplied from the schedule database 18, the system controller 19 manages the states of the MPEG video encoders 11-1 and 11-2 and the MPEG audio encoders 12-1 and 12-2 and controls the bit rates of video elementary streams that are output from the MPEG video encoders 11-1 and 11-2 and audio elementary streams that are output from the MPEG audio encoders 12-1 and 12-2. Further, the system controller 19 controls the amount of packets that are output from the SI/EPG data generator 17. Still further, the system controller 19 controls the multiplexers 13-1 and 13-2 and the transport stream multiplexer 14 to thereby control the video data occupation bandwidth, the audio data occupation bandwidth, and the EPG data occupation bandwidth in relation to the transmission channel bandwidth.

The transport stream multiplexer 14 multiplexes packets that are supplied from the multiplexers 13-1 and 13-2 and the SI/EPG data generator 17 and outputs a transport stream. A modulator 20 modulates a transport stream that is output from the transport stream multiplexer 14 according to a prescribed modulation scheme and outputs a modulated transport stream TS to, for example, an antenna (not shown) in the case of transmission by radio waves or to a prescribed interface in the case of transmission via a cable.

FIG. 4 is a table showing an EIT in which the total transmission rate of EPG information is set at 330 kbps. In the EIT shown in FIG. 4, the re-transmission cycle of program information of other stations that are 6-24 hours away is set at 10 seconds that is ½ of that of the EIT shown in FIG. 1. The re-transmission cycle of program information of other stations that are 2-3 days away is set at 20 seconds that is ⅓ of that of the EIT shown in FIG. 1. The re-transmission cycle of program information of other stations that are 4-8 days away is set at 30 seconds that is ⅙ of that of the EIT shown in FIG. 1. Therefore, the transmission rate of program information of other stations that are 6-24 hours away in the EIT shown in FIG. 4 is set at 64 kbps, which is two times higher than in the EIT shown in FIG. 1. The transmission rate of program information of other stations that are 2-3 days away in the EIT shown in FIG. 4 is set at 60 kbps, which is three times higher than in the EIT shown in FIG. 1. The transmission rate of program information of other stations that are 4-8 days away in the EIT shown in FIG. 4 is set at 120 kbps, which is six times higher than in the EIT of FIG. 1. A wider transmission channel bandwidth is required to transmit EPG data according to the EIT shown in FIG. 4 than to transmit EPG data according to the EIT shown in FIG. 1.

Figure 5:
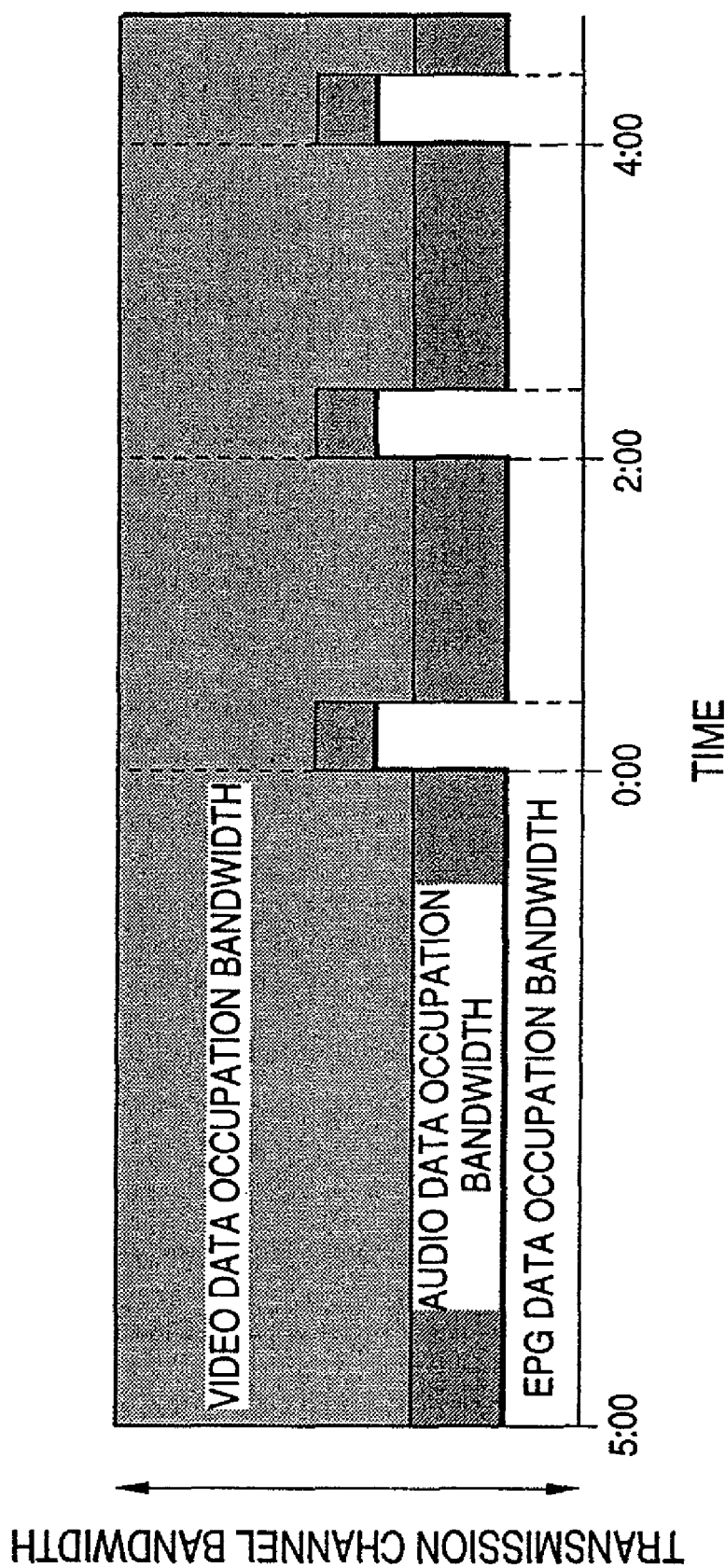
FIG. 5 shows how a video data occupation bandwidth, an audio data occupation bandwidth, and an EPG data occupation bandwidth vary with time in relation to a transmission channel bandwidth in a case where the transmission rate of EPG data is increased at prescribed time points.

FIG. 5 shows how a video data occupation bandwidth, an audio data occupation bandwidth, and EPG data occupation bandwidth vary with time in relation to a transmission channel bandwidth in a case where EPG data is transmitted according to the EIT of FIG. 4 in periods from time 0:00, 2:00, and 4:00 to prescribed time points and according to the EIT of FIG. 1 in the remaining periods. The EPG data occupation bandwidth is wider in the periods from time 0:00, 2:00, and 4:00 to the prescribed time points than in the remaining periods.

Conversely, the video data occupation bandwidth and the audio data occupation bandwidth are narrower in the periods from time 0:00, 2:00, and 4:00 to the prescribed time points than in the remaining periods. It is necessary to set the video data bit rate and the audio data bit rate lower in the periods from time 0:00, 2:00, and 4:00 to the prescribed time points than in the remaining periods.

Figure 6:
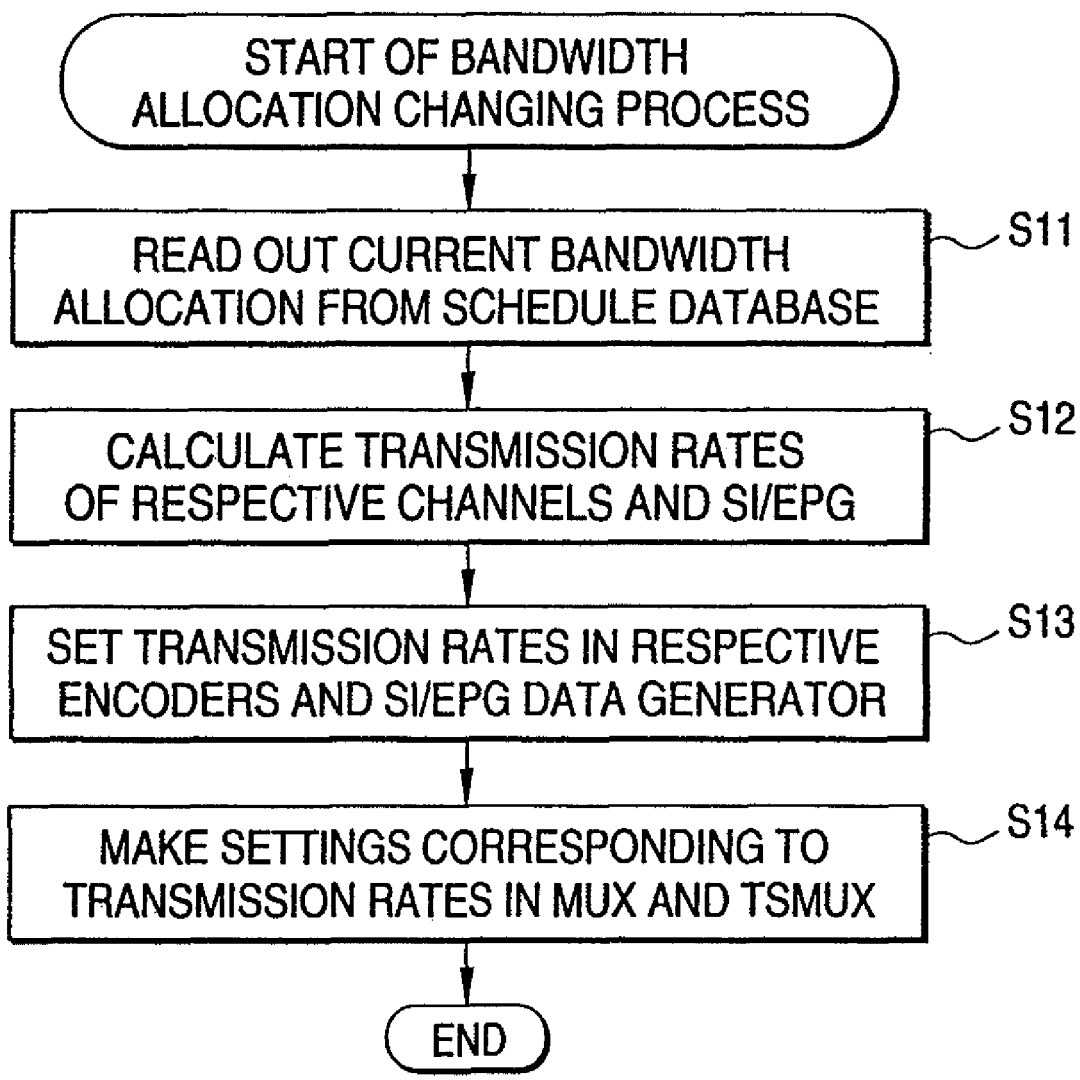
FIG. 6 is a flowchart showing a bandwidth allocation changing process of a system controller.

FIG. 6 is a flowchart showing a bandwidth allocation changing process of the system controller 19. At step S11, the system controller 19 reads out, from the schedule database 18, data indicating current allocation of a video data occupation bandwidth, an audio data occupation bandwidth, and an EPG data occupation bandwidth. At step S12, by using the read-out data indicating the bandwidth allocation, the system controller 19 calculates video data transmission rates of the channels corresponding to the MPEG video encoders 11-1 and 11-2, audio data transmission rates of the channels corresponding to the MPEG audio encoders 12-1 and 12-2, and a transmission rate of EPG data.

At step S13, the system controller 19 sets, in each of the MPEG video encoders 11-1 and 11-2, the MPEG audio encoders 12-1 and 12-2, and the SI/EPG data generator 17, a transmission rate of packets that are output therefrom. At step S14, the system controller 19 sets operations corresponding to the allocation of a video data occupation bandwidth, an audio data occupation bandwidth, and an EPG data occupation bandwidth in the multiplexers 13-1 and 13-2 and the transport stream multiplexer 14.

In the above-described manner, the information transmitting apparatus 1 can change the re-transmission cycle of EPG data at prescribed time points based on data that is set in the schedule database 18.

Figure 7:
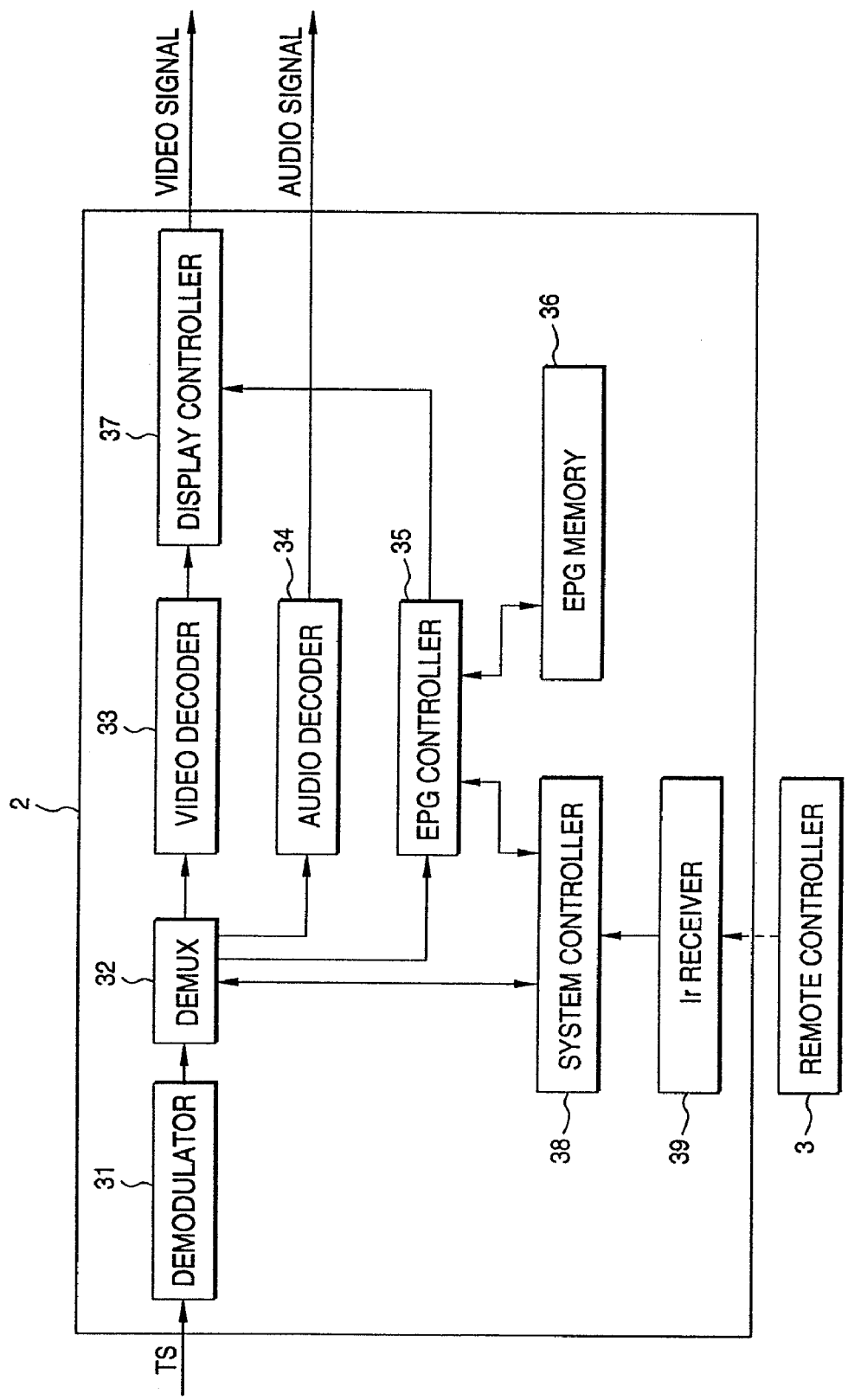
FIG. 7 is a block diagram showing the configuration of an information receiving apparatus according to an embodiment of the invention.

FIG. 7 is a block diagram showing an information receiving apparatus according to an embodiment of the invention. The information receiving apparatus 2 receives a transport stream that is supplied from a predetermined transmission channel and outputs a prescribed video signal and a prescribed audio signal based on a signal corresponding to a manipulation on a remote controller 3.

The remote controller 3 transmits a prescribed infrared signal to an infrared rays (Ir) receiver 39 of the information receiving apparatus 2 based on a manipulation such as a channel selection by the user of the information receiving apparatus 2. The Ir receiver 39 outputs, to a system controller 38, prescribed data corresponding to an infrared signal transmitted from the remote controller 3. The system controller 38 supplies a demultiplexer 32 with PID (packet identification data) that is based on a channel selection manipulation by the user, and supplies an EPG controller 35 with data indicating an operation that is based on a display manipulation by the user. The system controller 38 extracts data that is described in the descriptor of EPG data of current and next programs and indicates the transmission statuses of schedule EPG data that indicate program broadcast schedules.

A demodulator 31 demodulates a transport stream TS that has been modulated according to a prescribed scheme and supplies a demodulated transport stream to the demultiplexer 32. The demultiplexer 32 divides a transport stream, and supplies a video elementary stream obtained from packets having prescribed PID to a video encoder 33, an audio elementary stream obtained from packets having prescribed PID to an audio decoder 34, EPG data to the EPG controller 35, and SI data to the system controller 38.

The video decoder 33 decodes a received video elementary stream and outputs a video signal according to a prescribed scheme to a display controller 37. The audio decoder 34 decodes a received audio elementary stream and outputs an audio signal to the outside.

The EPG controller 35 stores EPG data that is supplied from the demultiplexer 32 in an EPG memory 36. The EPG controller 35 reads out data stored in the EPG memory 36 under the control of the system controller 38 and outputs the read-out data to the display controller 37 according to a prescribed scheme. The display controller 37 outputs a prescribed video signal to the outside based on signals supplied from the video decoder 33 and the EPG controller 35.

Figure 8:
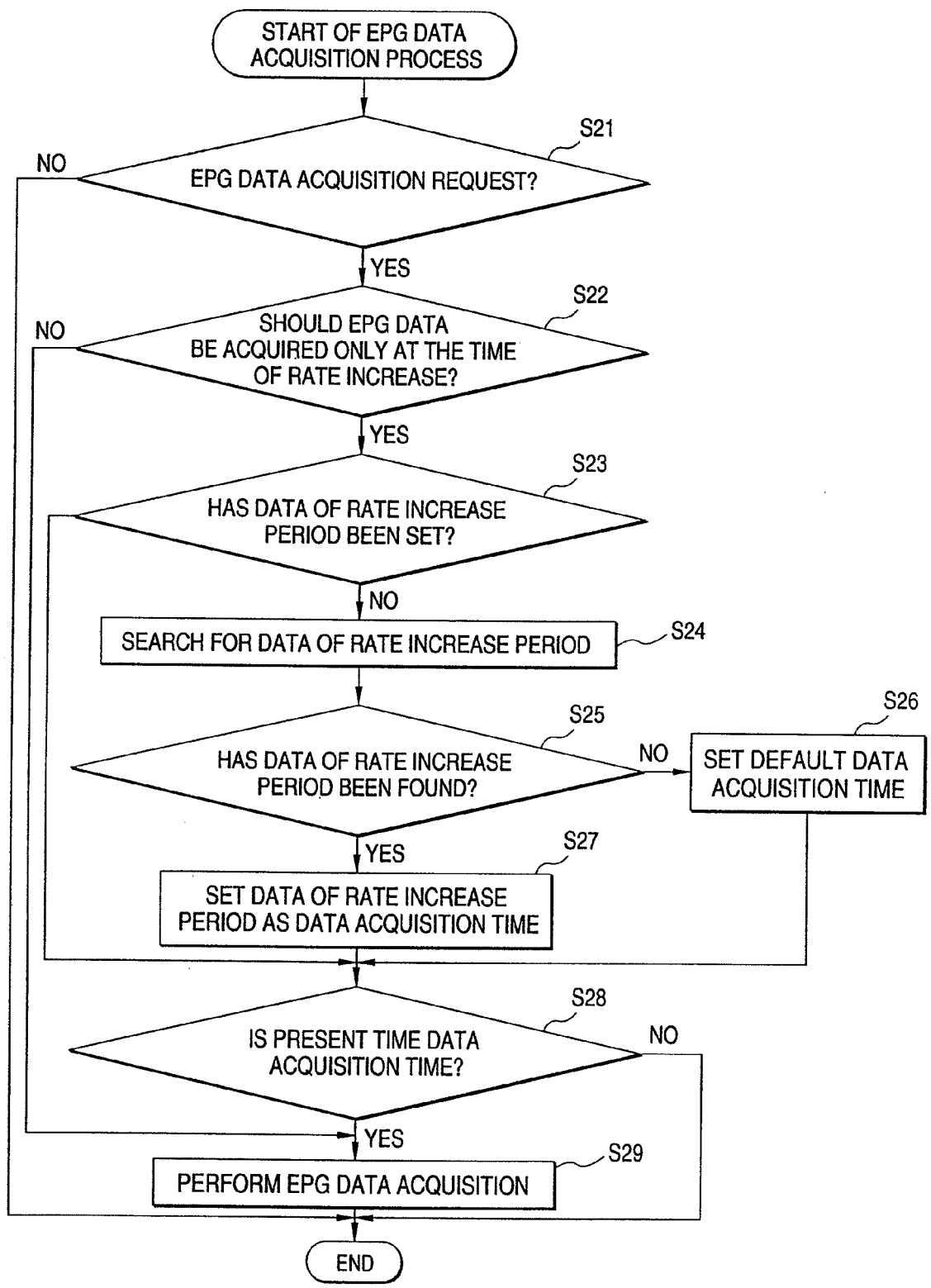
FIG. 8 is a flowchart showing the operation of an EPG data acquisition process of the information receiving apparatus.

FIG. 8 is a flowchart showing the operation of an EPG data acquisition process of the information receiving apparatus 2. At step S21, the system controller 38 judges whether there has occurred an EPG data acquisition request. If there has occurred an EPG data acquisition request, the process goes to step S22, where it is judged whether the setting of the system controller 38 by the user's manipulating the remote controller 3 is such that EPG data should be acquired only at the time of rate increase (the total transfer rate of EPG information is increased). If it is judged at step S22 that EPG data should be acquired only at the time of rate increase, the process goes to step S23, where the system controller 38 judges whether it has set data of a rate increase period in the EPG controller 35.

If it is judged at step S23 that no data of a rate increase period has been set in the EPG controller 35, the process goes to step S24, where the system controller 38 searches for data of an EPG data rate increase period that is included in SI data supplied from the demultiplexer 32. At step S25, the system controller 38 judges whether data of a rate increase period could be retrieved. If it is judged that data of a rate increase period could be retrieved, the process goes to step S27, where the system controller 38 sets the data of a rate increase period in the EPG controller 35 as data acquisition time. Then, the process goes to step S28.

If it is judged at step S25 that no data of a rate increase period could be retrieved, the system controller 38 sets default data acquisition time in the EPG controller 35. Then, the process goes to step S28.

At step S28, the EPG controller 35 judges whether the present time is the thus-set data acquisition time. If it is judged that the present time is the thus-set data acquisition time, the process goes to step S29, where EPG data is acquired and stored in the EPG memory 36.

If it is judged at step S28 that the present time is not the thus-set data acquisition time, the process is finished.

If it is judged at step S23 that data for a rate increase period has been set in the EPG controller 35, the process goes to step S28.

If it is judged at step S22 that EPG data should be acquired also at time other than the time of rate increase, the process goes to step S29, where EPG data is acquired and stored in the EPG memory 36.

If it is judged at step S21 that there has occurred no EPG data acquisition request, the process is finished.

As described above, the information receiving apparatus 2 can acquire EPG data only in rate increase periods. Periods when the total transmission rate of EPG information should be increased may be determined by management and the information receiving apparatus 2 may be caused to operate in accordance with the management.

FIG. 9 shows an EIT form that defines a description format of EPG data of current and next programs. A table ID (table_id) on the second line of the EIT to a last table ID (last_table_id) on the 16th line are a header portion to be used for identification of this EIT. An event ID (event_id) on the 18th line and the following items are for description of transmission information relating to the current and next programs, and has a loop structure to allow repetitive description of transmission information relating to a plurality of programs. The transmission information relating to the current and next programs consists of program start hours, program lengths, and other information. Information relating to a program such as a program title or a genre of the program can be described in a descriptor on the 25th line.

FIG. 10 shows a description of the transmission statuses of schedule EPG data that are described in the descriptor of EPG data of current and next programs and indicate program broadcast schedules. To describe the statuses of a plurality of schedule EPG data indicating program broadcast schedules, the second to sixth lines have a loop structure. A table ID (table_id) on the third line indicates an ID corresponding to schedule EPG data indicating a program broadcast schedule. A status flag (status flag) on the fourth line indicates that the information transmitting apparatus 1 is transmitting schedule EPG data indicating the corresponding program broadcast schedule if it has a value "1," and indicates that the information transmitting apparatus 1 is not doing so if it has a value "0." A version number (version_number) on the fifth line indicates a value that allows the information receiving apparatus 2 to recognize whether the content is the same as in an already acquired descriptor.

As described above, by reading out the contents of the descriptor of EPG data of current and next programs, the information receiving apparatus 2 can recognize, at the re-transmission cycle of the EPG data of current and next programs, the transmission statuses of schedule EPG data indicating program broadcast schedules.

FIG. 11 is a flowchart showing a process of the information receiving apparatus 2 for acquiring data of the transmission statuses of schedule EPG data indicating program broadcast schedules. At step S11, the system controller 38 reads out the descriptor of EPG data of current and next programs. At step S12, the system controller 38 judges whether the descriptor of the EPG data of current and next programs includes data that indicates the transmission status of schedule EPG data indicating a program broadcast schedule. If it is judged that the descriptor of the EPG data of current and next programs includes data that indicates the transmission status of schedule EPG data indicating a program broadcast schedule, the process goes to step S13, where a table ID and a version number is read out.

At step S14, the system controller 38 judges whether there exists already acquired data relating to the transmission status of schedule EPG data indicating a program broadcast schedule corresponding to the table ID that was read out at step S13. If it is judged that there exists already acquired data relating to the transmission status of schedule EPG data indicating a program broadcast schedule, the process goes to step S15. At step S15, the system controller 38 judges whether the version number has been updated by comparing the version number that is included in the already acquired data relating to the transmission status of schedule EPG data indicating a program broadcast schedule with the version number read out at step S13. If it is judged that the version number has been updated, the process goes to step S16, where the system controller 38 reads out the data of the transmission status of schedule EPG data indicating a program broadcast schedule and stores it in a prescribed register inside the system controller 38.

If it is judged at step S14 that there is no already acquired data relating to the transmission status of schedule EPG data indicating a program broadcast schedule, the process goes to step S16, where the system controller 38 reads out the data of the transmission status of schedule EPG data indicating a program broadcast schedule and stores it in a prescribed register inside the system controller 38.

If it is judged at step S15 that the version number has not been updated yet, the process goes to step S17.

At step S17, the system controller 38 judges whether there exists next data that indicates the transmission status of schedule EPG data indicating a program broadcast schedule. If it is judged that there exists next data that indicates a transmission status of schedule EPG data indicating a program broadcast schedule, the process returns to step S13 to repeat execution of step S13 and the following steps.

If it is judged at step S12 that the descriptor of the EPG data of current and next programs includes no data that indicates a transmission state of schedule EPG data indicating a program broadcast schedule, the process is finished. If it is judged at step S17 that there exists no next data that indicates a transmission state of schedule EPG data indicating a program broadcast schedule, the process is finished.

As described above, the information receiving apparatus 2 can recognize, at the re-transmission cycle of EPG data of current and next programs, the transmission statuses of schedule EPG data indicating latest program broadcast schedules by reading out the contents of the descriptor of the EPG data of current and next programs.

FIG. 12 shows a form of a table information table (TIT) that defines a description format of SI that indicates presence/absence of each piece of table information of an EIT or the like, a transmission cycle of EPG data, an updating date and time of EPG data, etc. The descriptions from a table ID (table_id) on the second line of the TIT to a last table ID (last_table_id) on the 16th line represent a header portion to be used for identification of this TIT. A table ID (table_id) on the 18th line and the following items describe transmission information relating to an EIT and has a loop structure to enable repetitive description of transmission information relating to a plurality of EITS. The transmission information relating to an EIT consists of a re-transmission cycle of the EIT, last updating time, a transmission status of the EIT, etc.

By utilizing transmission information relating to EITs that is described in SI according to the above TIT description format, the information receiving apparatus 2 can recognize the transmission statuses of schedule EPG data indicating program broadcast schedules by executing a process equivalent to the one shown in FIG. 11.

As described above, the information receiving apparatus 2 can recognize, in a short time, the transmission statuses of schedule EPG data indicating transmission-side program broadcast schedules.

In this specification, the term "system" means the entire apparatus that consists of a plurality of apparatuses.

Not only recording media such as a magnetic disk, a CD-ROM, a solid-state memory but also communication media such as a network and a satellite can be used as a provider for providing a user with a computer program for execution of the above-described process.

What is claimed is:

1. An information transmitting apparatus operable to transmit program information to an information receiving apparatus, the information transmitting apparatus comprising:
   program information data generating means operable to generate program guide information data representing schedules of programs transmitted in respective time slots and including status information indicating whether program guide information for a particular time slot has changed;
   first multiplexing means operable to multiplex an encoded video signal and an encoded audio signal to generate a multiplexed audio-video signal;
   second multiplexing means operable to multiplex the program guide information data with a multiplexed audio-video signal generated by the first multiplexing means to generate a multiplexed signal to be transmitted to the information receiving apparatus, such that said program guide information is transmitted in prescribed time periods in said multiplexed signal; and
   a controller operable to control the first and second multiplexing means to control the data rate at which said multiplexed audio-video signal and said program guide data are transmitted, wherein the status information indicates whether a version of said program guide data has changed; said controller being further operable to increase bandwidth of said program guide information data in said multiplexed signal while concurrently decreasing bandwidth of said encoded video and audio signals during said prescribed time periods in said multiplexed signal.

2. An information transmitting apparatus according to claim 1, wherein the transmission status information comprises a predetermined transmission scheme version data.

3. An information transmitting method for transmitting program information to an information receiving apparatus, the information transmitting method comprising:
   a program information data generating step for generating program guide information data representing schedules of programs transmitted in respective time slots and including status information indicating whether program guide information for a particular time slot has changed;
   a first multiplexing step far multiplexing an encoded video signal and an encoded audio signal to generate a multiplexed audio-video signal;
   a second multiplexing step for multiplexing the program guide information data with a multiplexed audio-video signal generated by the first multiplexing step to generate a multiplexed signal to be transmitted to the information receiving apparatus, such that said program guide information is transmitted in prescribed time periods in said multiplexed signal; and
   a controlling step for controlling the first and second multiplexing steps to control the data rate at which said multiplexed audio-video signal and said program guide data are transmitted,
   wherein the status information indicates whether a version of said program guide data has changed; said controlling step further increasing bandwidth of said program guide information data in said multiplexed signal while concurrently decreasing bandwidth of said encoded video and audio signals during said prescribed time periods in said multiplexed signal.

4. A non-transitory computer readable medium embedded with a computer program comprising program code for carrying out a method according to claim 3.

5. An information receiving apparatus, the information receiving apparatus comprising:
   demodulating means operable to receive program information that is cyclically re-transmitted, said program information being comprised of program guide information data representing programs transmitted in respective time slots at different future times, said program guide information data that represent programs to be transmitted at progressively more distant times in the future being transmitted to said receiving apparatus at progressively larger re-transmission cycle times at rate increase periods during which said program guide information data is transmitted at greater transmission rates, said program guide information data including status information indicating whether the received program guide information is valid and update information indicating whether program guide information for a particular time slot has changed, said program information being multiplexed with a multiplexed audio-video signal, the multiplexed audio-video signal being an encoded video signal multiplexed with an encoded audio signal, the information receiving apparatus further comprising:
   demultiplexing means operable to demultiplex the program guide information; and characterized by
   extracting means operable to extract said program guide information, said update information and said status information that is included in the program guide information data demultiplexed by the demultiplexing means,
   means for determining if said program guide information is valid, means responsive to the status information to judge whether the program guide information for a particular time slot has changed and, thus, whether a version of said program guide data has changed, and acquiring means to acquire from the received program information program guide data representing future programs only during said rate increase periods in accordance with said status information, such that the program guide data is acquired if said status information indicates that the program guide information is valid and if said update information indicates that the program guide information for a particular time slot has changed, said acquiring means not acquiring program guide information from the received program information if said version of said program guide data has not changed.

6. An information receiving apparatus according to claim 5, wherein the transmission status information comprises predetermined transmission scheme version data.

7. An information receiving method comprising:

receiving program information that is cyclically re-transmitted, said program information being comprised of program guide information data representing programs transmitted in respective time slots at different future times, said program guide information data that represent programs to be transmitted at progressively more distant times in the future being transmitted to said receiving apparatus at progressively larger re-transmission cycle times at rate increase periods during which said program guide information data is transmitted at greater transmission rates, said program guide information data including status information indicating whether the received program guide information is valid and update information indicating whether program guide information for a particular time slot has changed, said program information being multiplexed with a multiplexed audio-video signal, the multilplexed audio-video signal being an encoded video signal multiplexed with an encoded audio signal, the information receiving method further comprising:

a demultiplexing step for demultiplexing the program guide information;

an extracting step for extracting said program guide information, said update information and said status information that is included in the program guide information data demultiplexed by the demultiplexing step, determining if said program guide information is valid, responding to the status information to judge whether the program guide information for a particular time slot has changed and, thus, whether a version of said program guide data has changed, and an acquiring step for selectively acquiring from the received program information program guide data representing future programs only during said rate increase periods in accordance with said status information, such that the program guide data is acquired if said status information indicates that the program guide information is valid and if said update information indicates that the program guide information for a particular time slot has changed, said program guide information not being acquired from the received program information if said version of said program guide data has not changed.

8. A non-transitory computer readable medium embedded with a computer program comprising program code for carrying out a method according to claim 7.

9. A broadcasting system comprising:

an information transmitting apparatus comprising:

video encoding means for encoding a video signal;

audio encoding means for encoding an audio signal;

electronic program guide (EPG) data generating means for generating EPG data;

a schedule database defining, with respect to time, current allocations of a video data occupation bandwidth, an audio data occupation bandwidth and an EPG data occupation bandwidth;

multiplexing means for multiplexing the plurality of signals generate a multiplexed signal, such that said EPG data is transmitted in prescribed time periods in said multiplexed signal; and control means for controlling a data output rate of the video encoding means, a data output rate of the EPG data generating means, and the multiplexing ratio among the video data, the audio data, and the EPG data in the multiplexing means to thereby increase the occupation bandwidth of the EPG data in said multiplexed signal while concurrently decreasing the occupation bandwidths of the video data and the audio data in said multiplexed signal during said prescribed time periods in relation to a transmission channel bandwidth and in accordance with the schedule database, the video and audio data rates thereby being reduced when a temporarily higher EPG data output rate is to be accommodated during said prescribed time periods; and an information receiving apparatus;

the information transmitting apparatus being operable to transmit program information to the information receiving apparatus.

* * * * *